(12) United States Patent
Van Schyndel et al.

(10) Patent No.: US 6,718,036 B1
(45) Date of Patent: Apr. 6, 2004

(54) LINEAR PREDICTIVE CODING BASED ACOUSTIC ECHO CANCELLATION

(75) Inventors: Andre J. Van Schyndel, Kanata (CA); Jeff Lariviere, Ottawa (CA); Rafik Goubran, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/461,023

(22) Filed: Dec. 15, 1999

(51) Int. Cl.[7] .................................................. H04M 9/08
(52) U.S. Cl. .......................... 379/406.03; 379/406.01; 379/406.05; 379/406.08; 379/406.09; 379/406.11
(58) Field of Search ........................ 379/406.01–406.16

(56) References Cited

U.S. PATENT DOCUMENTS

| 4,672,665 A | * | 6/1987 | Nagai et al. | |
| 4,697,261 A | * | 9/1987 | Wang et al. | |
| 5,491,771 A | * | 2/1996 | Gupta et al. | |
| 5,857,167 A | | 1/1999 | Gritton et al. | .............. 704/223 |
| 6,205,124 B1 | * | 3/2001 | Hamdi | |

FOREIGN PATENT DOCUMENTS

WO          WO9859431       10/1997    ............ H04B/3/20

OTHER PUBLICATIONS

C. Acker & P. Vary; "Combined Implementation of Predictive Speech Coding and Acoustic Echo Cancellation"; Signal Processing VI: Theories and Applications, J. Vandewalle, R. Boite, M. Moonen, A. Oosterlinck (eds) 1992 Elsevier Science Publishers B.V., pp 1641 to 1644.

S. Yamamoto, S. Kitayama, J. Tamura & H. Ishigami; "An Adaptive Echo Canceller with Linear Predictor", The Transactions of The HECE of Japan, vol. E 62, No. 12, Dec. 1979, pp 851 to 857.

C. Acker, P. Vary; "Combined Implementation of Predictive Speech Coding and Acoustic Echo Cancellation", Institute for Communication systems and Data Processing Technical University of Aachen, Templergraben 55, 5100 Aachen, Germany. Publication Date Aug. 24, 1992; pp 1641–1644.

* cited by examiner

Primary Examiner—Forester W. Isen
Assistant Examiner—Ramnandan Singh (57) ABSTRACT

Handsfree telephony continues to be an increasingly desirable feature of modern telecommunications, whether in a conference room or mobile setting. Fundamental to the user acceptability of these systems is the performance of algorithms for acoustic echo cancellation, the purpose of which are to prevent the far-end signal from being transmitted back to the far-end talker. Most speech coding algorithms are based on some variant of Linear Predictive Coding (LPC), which reduces the amount of bits sent across a channel. Instead of doing echo cancellation in the time domain, the invention involves operating an acoustic echo canceller on the LPC parameters at the receiver, before the decoding stage.

21 Claims, 4 Drawing Sheets

LINEAR PREDICTIVE CODING BASED ACOUSTIC ECHO CANCELLATION

FIELD OF THE INVENTION

This invention relates to echo cancellation and, more particularly, to an improved method for carrying out acoustic echo cancellation in voice communication networks.

BACKGROUND OF THE INVENTION

In voice communication networks, the digital speech signal is ultimately transmitted from a source to a destination. A primary objective in devising speech encoders is to minimize the number of bits required to represent the speech signal, while maintaining speech intelligibility. This objective has led to the development of a class of low-bit rate vocoders (i.e. speech encoders), which are based on constructing a model of the speech source and transmitting the model parameters.

In the area of mobile communications, most speech coding methods are based on some variant of Linear Predictive Coding (LPC), the main purpose of which is to reduce the amount of bits sent across a channel. A linear predictive coder is a popular vocoder that extracts perceptually significant features of speech directly from a time waveform rather than from frequency spectra, as do channel and formant vocoders.

Fundamentally, an LPC encoder analyses a speech waveform to produce a time-varying model of the vocal tract excitation and transfer function. A synthesizer in the receiving terminal recreates the speech by passing the specified excitation through a mathematical model of the vocal tract. By periodically updating the parameters of the model and the specification of the excitation, the synthesizer adapts to changes in either. During any one specification interval, however, the vocal tract is assumed to represent a linear time-invariant process. Because only a handful of parameters are transmitted, the voice data rate is low. This type of speech coding may be used in limited bandwidth. applications where other techniques cannot. In addition, LPC provides more natural sounding speech than the purely frequency domain based vocoders.

Generally, the LPC encoder at the speaker's end generates various pieces of information which are transmitted to the listener's end where they are used to reconstruct the original speech signal. This information consists of (a) nature of the excitation i.e. voiced or unvoiced, (b) pitch period (for voiced excitation), (c) a gain factor and (d) predictor coefficients (parameters of vocal tract model).

In the field of modern telecommunications, hands-free telephony continues to be an increasingly desirable feature. Handsfree telephones are desirable in a variety of applications from teleconferencing systems, to mobile cellular phones and multimedia terminals. High-quality full-duplex handsfree communication is difficult to achieve, however. In these systems, the loudspeaker and microphone are typically located away from the users thereby requiring large signal gains to maintain comfortable volume levels. These large fixed gains may lead to electro-acoustic instability. In some handsfree systems, the microphone and loudspeaker are placed within the same acoustic enclosure in order to market the handsfree as a single desktop unit. In this case, the large amount of gain plus the close loudspeaker-microphone coupling provides a large echo path back to the talker conversing with the handsfree terminal. Currently, there is a strong emphasis on communications based on Voice over Internet Protocol (VoIP) and in this environment, the packet networks can introduce substantial delay into the echo path (e.g. >>40 ms). The delayed echo can seriously impair conversations.

A number of solutions have been proposed and implemented to make handsfree telephony a feasible technology. Traditionally, it has been assumed that two talkers will not converse at the same time and, as such, initial handsfree terminals achieved echo-free operation by introducing manual or automatic switched-loss functions in the unused voice path. This method requires some sort of switching decision mechanism to find who is the more deserving talker, and requires a finite amount of switching time. This switching can cause some impairment of its own, most noticeably clipping and chopping of words or sentences. The fact that only one voice path is available at a time defines this type of system as half-duplex. True full-duplex handsfree telephony may be possible, however, with 'echo cancellation' technology. Echo cancellers model the impulse response of the acoustic echo path and synthesize a replica of the actual echo signal for cancellation.

Echo cancellers come in two varieties. Line or hybrid echo cancellers cancel the echoes which leak through imperfect hybrid devices on the line. Acoustic echo cancellers (AECs), however, cancel the acoustic echo received by the microphone from the loudspeaker. Acoustic echo cancellation is a more involved and complex problem than electrical hybrid echo cancellation for various reasons: (a) the acoustic echo path is affected by any movement within its acoustic surroundings, (b) the length of cancellation required is very long (c), the presence of background acoustic noise in the room (d) and the acoustic echo path often has non-linear components, an example of which may be the loudspeaker. These non-linearities can be significant to the point that they limit the performance of most current echo cancellation schemes.

AECs generally employ adaptive filters to mathematically model and remove the loudspeaker-coupled component from the microphone signal. An adaptive filter is used to provide a linear model that represents the best fit to the unknown impulse response of acoustic echo path. Throughout the history of AEC implementation, the Least Mean Square (LMS) algorithm or Normalized Least Mean Square (NLMS) algorithm has often prevailed as the method of choice, due to its simplicity and low computational requirements. In recent years, as available processing power has increased, algorithms which offer better performance albeit at a higher computational cost have become desirable.

One such algorithm which offers better performance, is the Generalized Multi-Delay Frequency (GMDF) domain adaptive filter. Since the algorithm operates in the frequency domain, a separate domain transformation stage is required. Therefore, some block processing is always necessary before filtering can take place. This introduces throughput delay, which is undesirable, especially in situations where the communications link is already introducing delay. Delay during conversations decreases the amount of perceptibly tolerable echo, which then increases the performance requirements of the acoustic echo canceller.

Fundamental to the user acceptability of handsfree systems is the performance of algorithms for acoustic echo cancellation and noise reduction. For these and other reasons, acoustic echo cancellers continue to be an area of great interest. In particular, issues pertaining to the stability and convergence rate of these algorithms are the subjects of on-going research. The convergence speed is the time required to reach a steady-state mean-squared error variance from algorithm intialization. Increasing the convergence depth and rate of the echo canceller are two contributing factors which will increase the maximum achievable cancellation.

SUMMARY OF THE INVENTION

The present invention is an innovative way of performing acoustic echo cancellation in telephone terminals, particularly in handsfree mode, that results in improved performance and reduced processing load. Most speech coding algorithms are based on some variant of linear predictive coding (LPC), and data which has undergone this transformation is in a form more amenable to echo cancellation. Instead of doing echo cancellation in the time domain, the echo canceller is operated in the LPC domain resulting in a process more matched with speech characteristics.

Specifically, a far-end speech signal and the LPC parameters it is constructed from are used in conjunction with an adaptive model of the acoustic echo path between the loudspeaker and microphone to generate estimates of the corresponding echo LPC parameters. The echo LPC parameters are then fed into a standard LPC decoder which synthesizes a real-time estimate of the echo signal. This estimate of the echo signal is subtracted from the microphone signal to isolate the local (near-end) speech. In this manner, the acoustic echo path is not unnecessarily modelled in areas that are not relevant to the speech and will, therefore, not contribute to the speech quality.

Operating an acoustic echo canceller (AEC) on the LPC parameters at the receiver, before the decoding stage offers some important advantages. Firstly, the speech coding process produces a noise-like 'excitation sequence' which, if used as an input to an NLMS algorithm, will speed up the convergence rate. Secondly, the acoustic echo canceller (AEC) and the LPC encoder may share some of the computation processing load since the domain transformation (from time to LPC parameters) is already part of the encoding stage. In addition, an echo code book may be used to store the necessary excitation sequence for the echo cancellation process, reducing the adaptive filtering process to a simple table lookup procedure. Also, the LPC transform data has less parameters and, hence, less taps and can therefore be more efficient, due directly to the reduction in bit rate. As well, LPC space coordinates are based on speech characteristics. Speech input to the LPC transform is, therefore, spectrally broad stimulating the LPC coordinates with a density much more uniform than in a Fourier transform or direct temporal filter models. This leads to faster and more uniform convergence of the LPC echo model. Lastly, the performance available today of noise and echo cancellers operating in the time domain is the result of many years of research and optimization. If such efforts are applied to the present invention, an even increased performance can surely be realized in the future.

Other aspects and features of the present invention will become apparent to those ordinarily skilled in the art upon review of the following description of specific embodiments of the invention in conjunction with the accompanying drawings.

DESCRIPTION OF THE PREFERRED EMBODIMENTS

Figure 1:
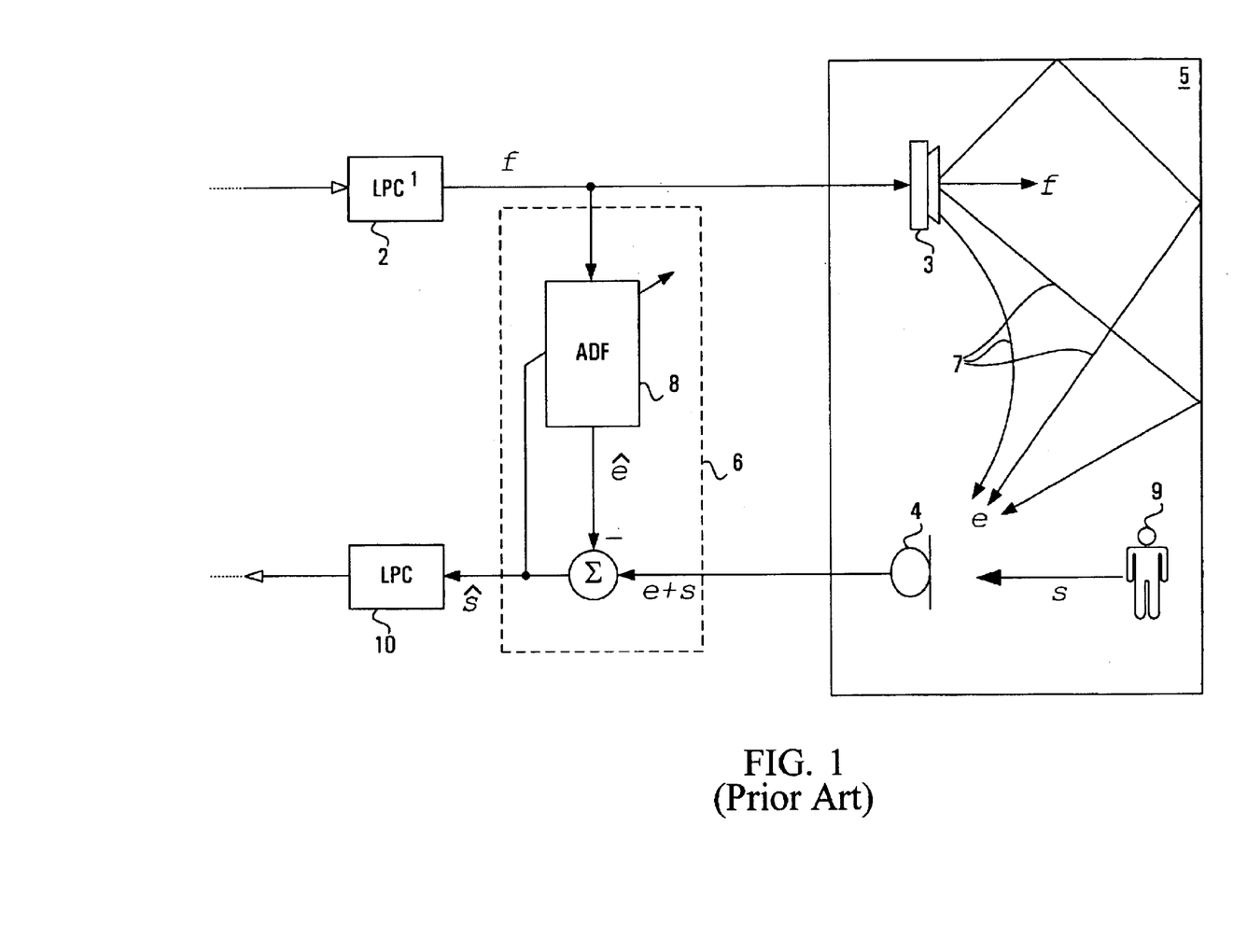
FIG. 1 is a depiction of a physical system incorporating a conventional acoustic echo canceller.

FIG. 1 illustrates the standard implementation of an acoustic echo canceller within a voice communications system. This configuration may represent, for example, an acoustic environment 5 containing a handsfree telephone set which is connected to a full-duplex communications network. An LPC decoder (LPC$^{-1}$) 2 synthesizes a far-end speech signal, f, that is played through a loudspeaker 3 in the telephone set. A microphone 4 in the telephone set captures a near-end speech signal, s, from a near-end user 9, plus an acoustic echo signal, e, to produce a composite microphone signal, e+s. The output of the LPC decoder 2 is also fed into an acoustic echo canceller (AEC) 6, which includes an adaptive digital filter (ADF) 8 for generating an estimate of the echo signal, ê. The estimate of the echo signal, ê, is then subtracted from the composite microphone signal, e+s, leaving a signal ŝ which approximates the near-end speech signal without the echo. The approximation of the near-end speech signal, ŝ, is fed into an LPC encoder 10 whose output may then be transmitted to a far-end destination.

In practice, the composite microphone signal, e+s, may also include a near-end speech signal echo (reverberation) and a near-end ambient noise signal. For the purposes of the present description the reverberation and near-end ambient noise are ignored as they do not affect the implementation of the invention.

The input to the LPC decoder 2 originates from the far-end side of the network and is a transmitted bit stream comprised of a sequence of data frames. Each data frame consists of a set of LPC parameters which are extracted by an LPC encoder at the far-end side of the network. Conversely, the LPC encoder 10 extracts LPC parameters from the approximation of the near-end speech signal, ŝ, which may then be transmitted to the far-end user side of the network. In either case, the parameters for a given frame of speech may include a set of predictor coefficients, a voiced/unvoiced indication bit, a gain factor and a value for the pitch period (if the signal is voiced).

The transmission of the voiced/unvoiced indication bit is more prevalent in older methods of LPC. In such cases, an excitation sequence would be generated at the receiving end on the basis of the voiced/unvoiced decision and the pitch period. For example, if the speech segment was determined to be unvoiced, band-limited white noise would be used as the excitation sequence. If the speech segment was determined to be voiced, a train of pulses would be generated at the pitch period. More recent versions of LPC, however, either pass the excitation sequence directly (in the form of an excitation vector), or pass an index number where, at the receiving end, a code-book (i.e. a group of excitation vectors each referenced by a unique index number) would be used to obtain the desired excitation sequence. [R. Steele (Ed.), "Mobile Radio Communications", IEEE Press, New York, 1992, 1994, 1995, Chapter 3.5.3—Code-Excited Linear Prediction (CELP)]. In the description hereinafter, the more recent version of LPC is considered with Xf referring to the excitation vector. However, it should be appreciated that the techniques described herein may be applied to various other methods of LPC by those skilled in the art.

The acoustic environment 5 may be a conference room containing a near-end user. Due to reflections in the acoustic environment 5 and close coupling between the loudspeaker 3 and microphone 4, some of the far-end speech signal, f, in the form of an echo signal, e, will be picked up by the set's microphone 4 in addition to the near-end speech signal, s. The microphone 4, therefore, unavoidably picks up a composite signal, e+s, comprising the near-end speech signal plus the echo signal.

The adaptive digital filter (ADF) 8 usually takes the form of a very large transversal filter, which simulates the impulse response coupled between the loudspeaker 3 and microphone 4. In this respect, adaptive filtering is applied to model the changing impulse response of the acoustic environment 5. In simple terms, the ADF 8 models the impact of the acoustic environment 5 on the far-end speech signal, f, to provide an estimate of the true echo signal, ê. In this way, an approximation of the near-end speech signal, ŝ, may be isolated and transmitted to a far-end destination free of echo effects.

Figure 2:
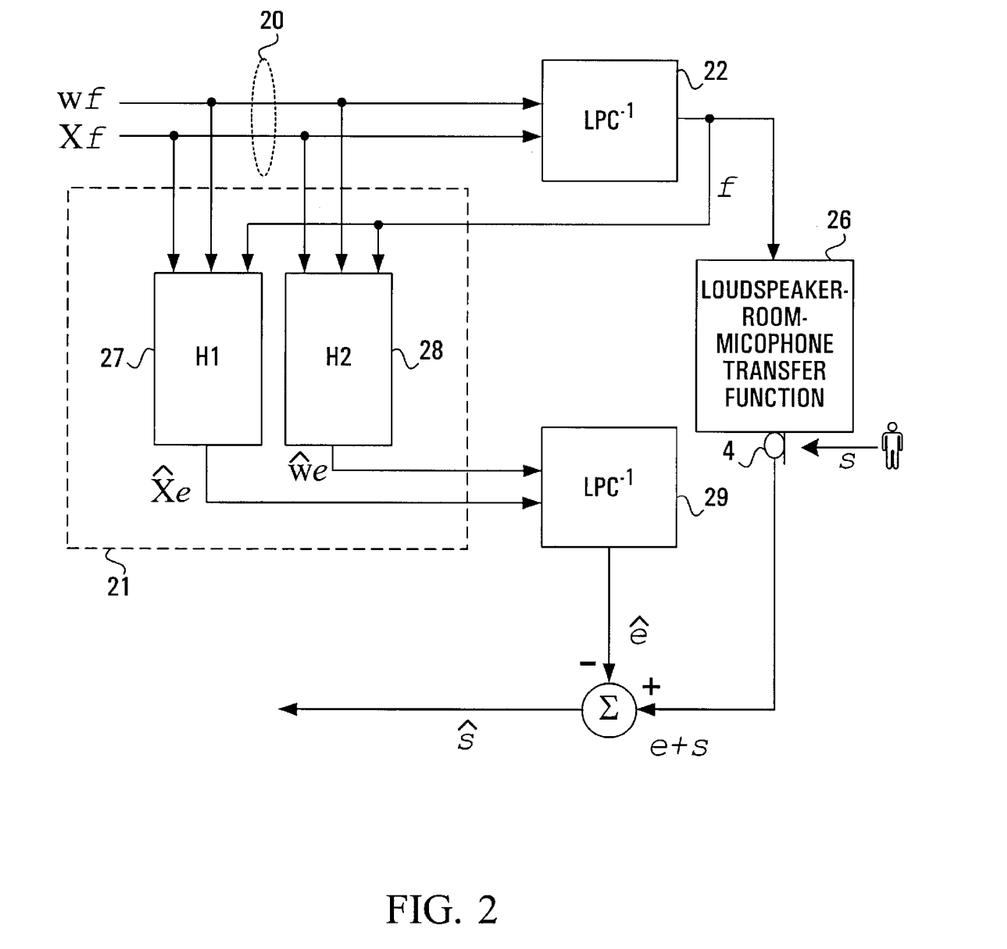
FIG. 2 depicts a generalized model of an acoustic echo canceller operating in the LPC domain according to the present invention.

FIG. 2 depicts the operation of an acoustic echo canceller (AEC) in the LPC domain according to the present invention. In this implementation, LPC parameters of the far-end speech signal, comprising a far-end excitation vector, Xf, and a set of far-end LP coefficients, wf, are transmitted via a data link 20 to a first LPC decoder (LPC$^{-1}$) 22 which synthesizes a far-end speech signal, f. The far-end speech signal, f, reacts with a loudspeaker-room-microphone transfer function 26 to produce a composite signal, e+s, comprised of an echo signal, e, which adds to a near-end speech signal, s forming a composite signal e+s. The output of the LPC decoder (LPC$^{-1}$) 22 is fed back as an input to an echo estimation unit 21 comprising a first (H1) and second (H2) functional block 27, 28 respectively. The far-end LP coefficients, wf, far-end excitation vector, Xf, and far-end speech signal, f, are input into the first functional block (H1) 27 which generates an estimate for the echo excitation vector, X̂e, from the inputs Xf, wf and f. Similarly, the second functional block (H2) 28 generates an estimate of the echo LP coefficients, ŵe, from inputs Xf, wf and f. The estimates for the echo excitation vector, X̂e, and echo LP coefficients, ŵe, are fed into a second LPC decoder (LPC$^{-1}$) 29 which synthesizes an estimate of the echo signal, ê. The estimate of the echo signal, ê, is then subtracted from the composite signal, e+s, leaving only an approximation of the near-end speech signal, ŝ.

In FIG. 2, the LPC decoder 22 is shown to have the two separate input parameters Xf and wf. These parameters are actually transmitted as a single bit stream along the data link 20, as indicated in FIG. 1 by the input of LPC decoder 2. The loudspeaker-room-microphone transfer function 26 represents the acoustic environment 5 of FIG. 1. The structure of the LPC decoders 22, 29 follows directly from the LPC process. For example, LPC decoder 22 may be comprised of a flat-spectrum excitation source and a spectral shaping filter. The LPC decoder 22 uses the far-end excitation vector, Xf, and far-end LP coefficents, wf, to synthesize a replica of the far-end speech signal, f. The parameters defining the excitation source and spectral shaping filter of the decoder will be periodically updated, adapting to any changes observed in the LPC analysis stage. In this way, the description of the encoder also defines the decoder. Similarly, LPC decoder 29 synthesizes an estimate of the echo signal, ê, based on inputs X̂e and ŵe. For the remainder of the specification, LPC decoders may simply be regarded as 'black boxes' that synthesize acoustic speech signals from corresponding LPC parameters.

Figure 3:
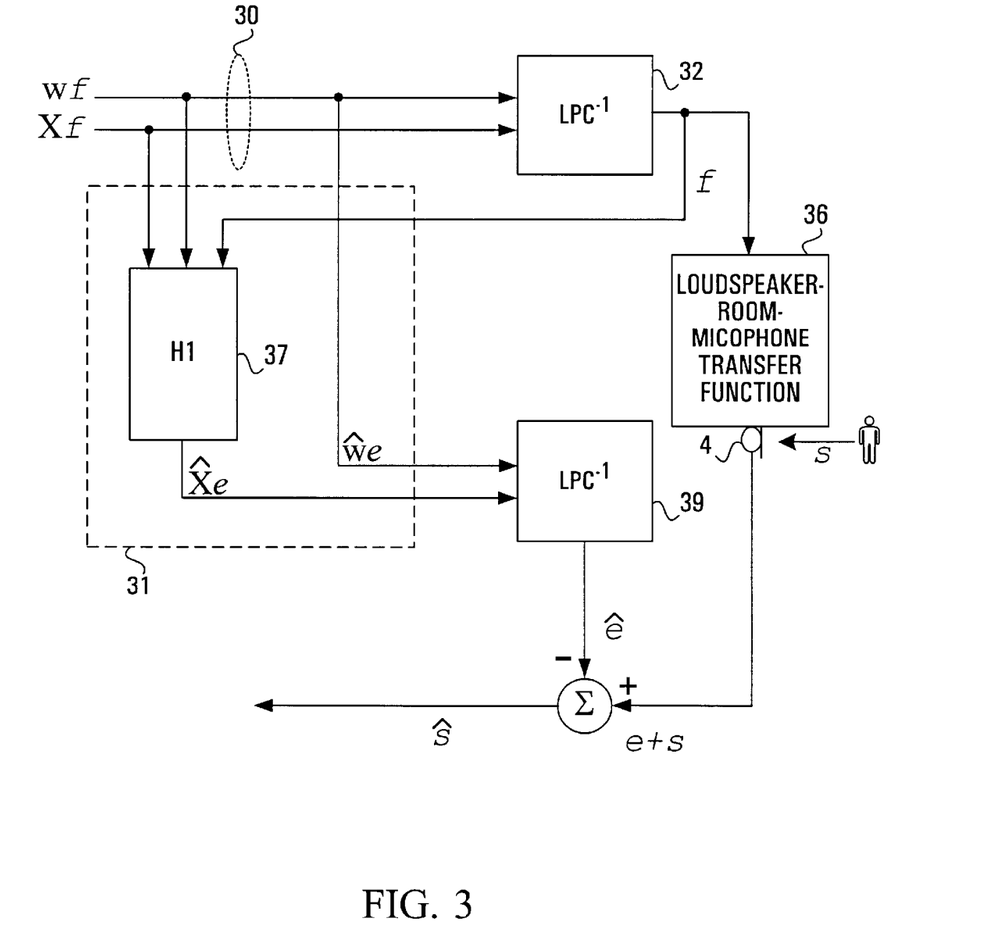
FIG. 3 illustrates a simplified model of an acoustic echo canceller operating in the LPC domain according to the present invention.

In contrast to the generalized structure of FIG. 2, FIG. 3 illustrates a simplified implementation where the far-end LP coefficients, wf, are used directly as an estimate for the echo LP coefficients, ŵe. That is, the components in FIG. 3 are identical in structure and function to those in FIG. 2 except that the functional block (H2) is now omitted. Again, the output of an echo estimation unit 31, namely the echo excitation vector, X̂e, and the echo LP coefficients, ŵe, are provided as input to an LPC decoder (LPC$^{-1}$) 39 which synthesizes an estimate of the echo signal, ê. The estimated echo signal is then subtracted from the composite microphone signal, e+s, to provide an approximation of the near-end speech signal, ŝ.

The functional blocks 27 and 28 of FIG. 2 and functional block 37 of FIG. 3, model the effect of the acoustic echo path on the far-end LPC parameters and speech signal to generate an estimate of the corresponding echo LPC parameters. Starting with the generalized structure of FIG. 2 for the case when f is stationary (i.e. wf doesn't change over time), the functional block (H1) 27 provides an estimate of the echo excitation vector, X̂e, in terms of Xf, wf and f. The echo signal may, of course, be represented as the convolution of the far-end speech signal with the room's impulse response. Substituting the corresponding LPC expressions for the echo and far-end speech signal into this model will, therefore, yield an estimate for the echo excitation vector, X̂e.

Specifically, the echo may be represented by the convolution sum, $$e(n) = \sum_{j=0}^{L-1} h(j)f(n-j) \qquad \text{equation (1)}$$

here h(j) for 0≦j<L are the taps of the impulse response of the loudspeaker-room-microphone acoustic path, L is the length of the acoustic path's impulse response and f(n−j) is the far-end speech signal delayed by j samples.

The far-end speech signal, f, may be expressed in conventional LPC form as $$f(n) = \sum_{i=1}^{M} w_f(i)f(n-i) + X_f(n) \qquad \text{equation (2)}$$

where $w_f(i)$ for 1≦i≦M are the linear predictor coefficients of the far-end speech signal with M being the number of predictor coefficients, f(n−i) is the delayed far-end speech signal and $X_f(n)$ is the far-end speech signal's excitation vector at time n. Similarly, the echo signal, e, can be represented in LPC form as $$e(n) = \sum_{i=1}^{M} w_e(i)e(n-i) + X_e(n) \qquad \text{equation (3)}$$

where $w_e(i)$ for 1≦i≦M are the linear predictor coefficients of the echo signal, e(n−i) is the echo signal delayed i samples and $X_e(n)$ is the echo signal's excitation vector at time n.

Substituting equations (2) and (3) into equation (1) and solving for $X_e(n)$ yields an estimate for the echo excitation vector, X̂e. That is, $$\hat{X}_e(n) = \sum_{j=0}^{L-1} h(j)\left[X_f(n-j) + \sum_{i=1}^{M}(w_f(i) - w_e(i))f(n-j-i)\right]$$ equation (4)

However, in the simplified model of FIG. 3, wf=ŵe, and it is apparent that equation (4) reduces to $$\hat{X}_e(n) = \sum_{j=0}^{L-1} h(j)X_f(n-j)$$ equation (5)

For a non-stationary far-end speech signal, f, (for example, wf changes every 5 ms), a more rigorous analysis is needed. In any case, the following estimate for the echo excitation vector is obtained $$\hat{X}_e(n) = Y(n) + \sum_{j=0}^{L-1} h(j)X_f(n-j) + \sum_{i=1}^{M}(w_f(i)-w_e(i))e(n-i)$$ equation (6)

where all terms except Y(n) have been defined in equations (1) through (3) and where $$Y(n) = \sum_{j=SP+n+1}^{L-1} h(j)\sum_{i=1}^{M}(w_f^{-S-1}(i)-w_f(i))f(n-i-j) +$$
$$\sum_{s=0}^{S-1}\sum_{j=sP+n+1}^{(s+1)P+n} h(j)\sum_{i=1}^{M}(w_f^{-s-1}(i)-w_f(i))f(n-i-j)$$ equation (7)

where P is the block size (e.g. a 5 ms analysis block at a 8 kHz sampling rate would give P=8000*0.005=40), S is the total number of previous blocks required and is defined by $$S = floor[L-1/P]$$

where floor[.] indicates integer truncation to the closest integer less than or equal to the bracketed term, L is the length of the acoustic path's impulse response and where $w_f^{-s}(i)$ for $1 \leq i \leq M$ indicates the far-end speech signal's linear prediction coefficients s blocks in the past with $w_f^{-0}(i) = w_f(i)$.

In the above analysis, only an estimate of the echo excitation vector, X̂e, as a function of Xf, wf, and f is derived since the far-end LP coefficients, wf, may be used directly as an estimate for the echo LP coefficients, ŵe However, it should be noted that a relationship may also be derived for an estimate of an autocorrelation vector, r̂e, from which an estimate of the LP coefficients, ŵe, can be obtained through Levinson-Durbin recursion. The functional block (H2) 28 contained in the echo estimation unit 21 of FIG. 2 represents this process.

In any case, once X̂e and ŵe are obtained, they are fed into an LPC decoder 29 or 39 which synthesizes an estimate of the echo signal, ê. This is subtracted from the composite microphone signal, e+s, leaving an approximation of the near-end speech signal, ŝ, thereby completing the echo cancellation process. The approximation of the near-end speech signal, ŝ, free of echo effects, can then be analyzed to extract corresponding LPC parameters for transmission to the far-end user side of the voice network.

It should be noted that the response of the acoustic echo path, h(j), may itself be constantly changing due to movement of the near-end user, for example. In most practical systems, then, the acoustic echo path may be dynamically modelled using any suitable adaptive filtering algorithm. As stated before, the traditional approach is the Normalized Least Mean Square (NLMS) algorithm due to its simplicity and low computational requirements.

FIGS. 2 and 3 depict implementations of the invention which reflect only a short-term prediction analysis having been conducted in the encoding stage. In general, however, long-term prediction is included in LPC analysis to remove periodicity from the excitation vector (which is related to the pitch period of the original speech signal). In this case, the LPC decoders may consist of a short-term predictor synthesis filter in cascade with a long-term predictor synthesis filter. The short-term synthesis filter models the short-term correlations in the speech signal. Likewise, the long-term predictor filter models the long-term correlations in the speech signal. Its parameters are a delay and a gain factor. For periodic signals, the delay corresponds to the pitch period; for non-periodic signals the delay is random.

In this full model of speech production, the far-end speech signal may be represented by the general function $$f(n) = \sum_{i=1}^{M} w_f(i)f(n-i) + X_f(n) + G_f f(n-\alpha_f)$$ equation (8)

where f(n) is the far-end speech at time n, $w_f(i)$ for $1 \leq i \leq M$ are the far-end linear predictor coefficients, $X_f(n)$ is the far-end excitation sequence at time n, $G_f$ is the far-end long-term predictor gain factor and $\alpha_f$ is the far-end long-term predictor delay.

Figure 4:
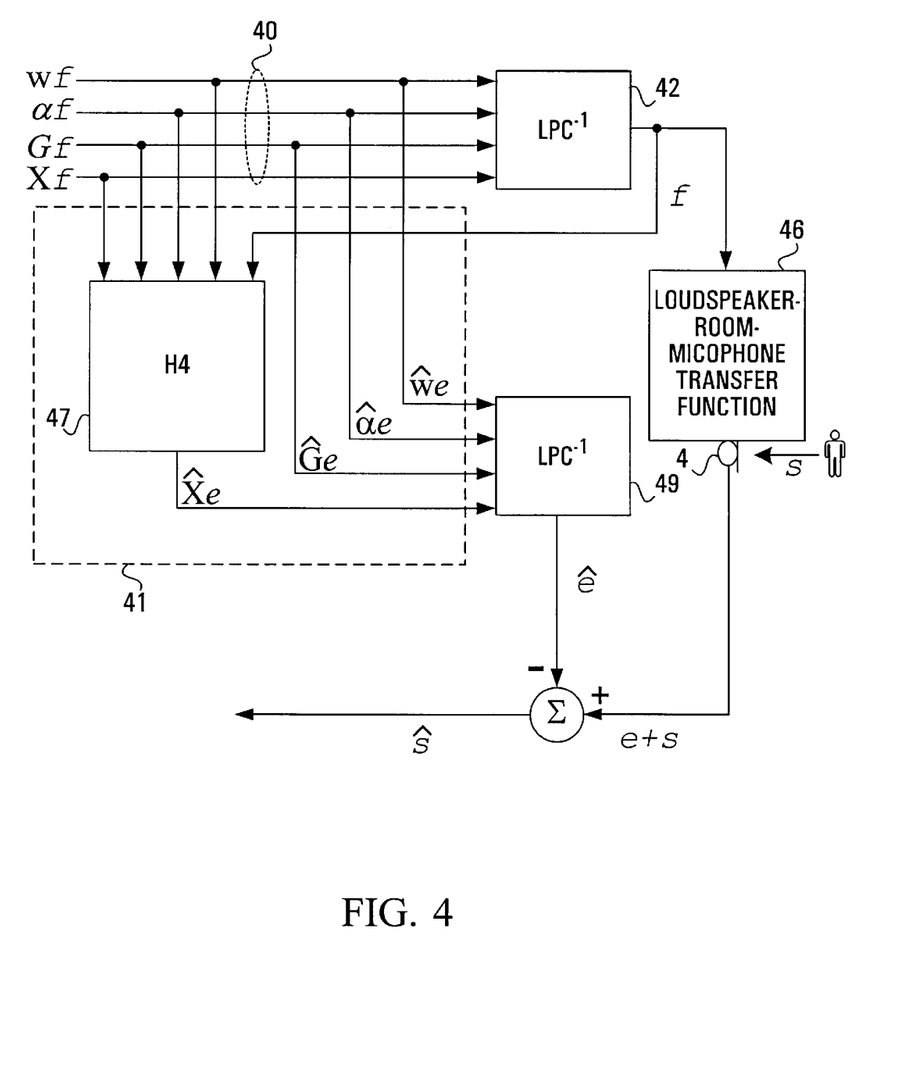
FIG. 4 depicts the preferred implementation of an acoustic echo canceller operating in the LPC domain according to the present invention.

Accordingly, FIG. 4 illustrates the preferred implementation of the invention which takes such long-term prediction analysis into account. In fact, the implementation in FIG. 4 is nearly identical to that in FIG. 3 with the exception that additional LPC parameters in the form of a delay, αf, and a gain factor, Gf, for the long-term predictor filter, have been included. In this case wf, αf, Gf, Xf are transmitted along a data link 40 to an LPC decoder (LPC$^{-1}$) 42 which reconstructs a far-end speech signal, f. The parameters wf, αf, Gf, Xf, and the far-end speech signal, f, are input into a functional block (H4) 47 of an echo estimation unit 41 which models the effect of the acoustic echo path on them to generate an estimate of the echo excitation vector, X̂e. The estimate of the echo excitation vector can be obtained by carrying out a similar analysis as before for both the stationary and non-stationary case.

For the stationary case, the functional block (H4) may be simplified to $$\hat{X}_e(n) = \sum_{j=0}^{L-1} h(j)X_f(n-j)$$ equation (9)

This means that the excitation vector of the echo signal can be recovered by simply convolving the excitation vector of the far-end speech with the room impulse response and that it is not related to the LPC parameters of the speech signal anymore. Unfortunately, the simplification used in the derivation of equation (9) is only valid for the stationary case. Carrying out a detailed analysis for the non-stationary case yields $$\hat{X}_e(n) = \sum_{j=0}^{L-1} h(j) \frac{\partial \hat{X}_e(n)}{\partial h(j)} \qquad \text{equation (10)}$$

where $$\frac{\partial \hat{X}_e(n)}{\partial h(j)}$$

is the partial derivative of the estimate of the echo signal's excitation vector at time n with respect to the jth tap of the acoustic path's impulse response, and is defined as:

$$\frac{\partial \hat{X}_e(n)}{\partial h(j)} = f(n-j) - G_f f(n-j-\alpha_f) - \sum_{i=1}^{M} w_f(i) f(n-i-j) + \sum_{i=1}^{M} w_f^{-c-1}(i) G_f f(n-i-j-\alpha_f) \qquad \text{equation (11)}$$

where $G_f$ is the far-end long-term predictor gain factor, $\alpha_f$ is the far-end long-term predictor delay (pitch period), $$c = floor[\alpha_f - n/P]$$

and $w_f^{-c-1}(i)$ for $1 \leq i \leq M$ are the far-end speech signal's linear predictor coefficients c−1 blocks in the past.

As before, the echo signal is forced to conform to an LPC model where its LP coefficients are taken directly from the far-end speech parameters (i.e. wf is used as an approximation for ŵe). Similarly, the delay, αf, and gain factor, Gf, of the far-end long-term predictor synthesis filter are used as direct estimates for an echo long-term predictor delay, α̂e, and an echo long-term predictor gain factor, Ĝe, respectively. The estimates of the echo-excitation vector, X̂e, echo LP coefficients, ŵe, echo long-term predictor gain factor, Ĝe, and echo long-term predictor delay, α̂e, are fed into an LPC decoder (LPC$^{-1}$) 49 which synthesizes an estimate of the echo signal, ê. As before, the estimate of the echo signal, ê, is subtracted from the composite microphone signal, e+s, to complete the echo cancellation process, thereby leaving only an estimate of the near-end speech signal, ŝ.

In general, a number of theoretical ways exist to obtain an approximation of the near-end speech signal other than simply subtracting the estimate of the echo signal from the composite microphone signal. For example, one alternative to such time-domain manipulation is to transform the echo estimate and the composite microphone signal to another domain (e.g. the frequency domain), manipulate the signals in the chosen domain, and then inverse transform the resultant signal back to the time domain. Similarly, other methods may also be employed. It is noted also that although the aim of the invention is to substantially eliminate the acoustic echo at the near end derived from the far-end signal in some cases the effect may be simply a reduction in the acoustic echo transmitted.

Operating an acoustic echo canceller in the LPC domain, i.e. operating on the filter coefficients and the excitation sequence, offers the potential of improved performance for several reasons. Firstly, the removal of signal correlation through the LPC process improves the convergence properties of adaptive filters using simple adaptation algorithms such as the Least Mean Square (LMS) algorithm. In other words, the LPC process produces a noise-like excitation sequence which if used as an input to an NLMS algorithm will speed up the convergence rate. In addition, the AEC and LPC encoder can share some of the computation processing load. That is, the transformation to the filtering domain is already being performed as part of the coding process and this will, therefore, reduce the processing load of the echo cancellation process. Further potential benefits of such an approach are also apparent.

For example, performing echo cancellation in the time domain, and to a lesser extent in the frequency domain, has been extensively studied by researchers in the past few years. The performance that has been realized to date is the result of several years of research and optimization. This invention is a new and different way of viewing the problem that is more matched with speech characteristics. It is expected, then, that the performance of AECs according to the invention may be similarly improved if such efforts are devoted to their optimization.

Information compression in the LPC domain is the result of removing information that is not matched with speech characteristics. The proposed invention attempts to do the same with the echo canceller. In other words, there is no need to model the transfer function in areas that are not relevant to the speech and will, therefore, not affect speech quality.

The main advantages of this invention lie in the area of network and acoustic echo cancellation. In general, network echo cancellation is similar to acoustic echo cancellation with the exception that the network echo path characteristics, once a connection is established, tend to be more stable than for an acoustic echo path. Network echo cancellers may, therefore, benefit most from this approach.

Moreover, while the invention is primarily intended for use with a terminal in a handsfree mode the invention may also be used to effect in some erminals which do not have a handsfree mode but which may also provide inwanted acoustic coupling between the earpiece and the mouthpiece.

Finally, adaptive filtering techniques may be compared using various measures of performance, two of which are the Echo Return Loss Enhancement (ERLE) and system distance (D). ERLE defines the difference in average power between the primary signal and the error signal. State-of-the-art AECs appear to be limited to a steady-state ERLE of 25 dB, while greater than 40 dB is desired in practice. System distance, on the other hand, is defined as the mean-square difference between the estimated room transfer function and the actual room transfer function. The technique described herein exhibits considerable improvement in both convergence depth and rate over the traditional NLMS approach. For example, simulations have shown an improvement of greater than 14 dB in system distance (D), and greater than 8 dB in ERLE compared to state-of-the-art NLMS techniques. As a performance measure, system distance is usually preferred over ERLE since it is not dependent on the input speech characteristics, and therefore gives a more accurate measurement of convergence rate.

While preferred embodiments of the invention have been described and illustrated, it will be apparent to one skilled in the art that numerous modifications, variations and adaptations may be made without departing from the scope of the invention as defined in the claims appended hereto.

What is claimed is:

1. In a voice communications system, a method of canceling an audible echo signal present in a composite speech signal containing said echo signal and a near-end speech signal, said echo signal resulting from a far-end speech signal propagating along an acoustic echo path on a near-end user side of the system, said far-end speech signal synthesized from a first set of speech synthesis parameters, the method comprising:

passing the first set of speech synthesis parameters and said far-end speech signal through an echo estimation unit, thereby to generate a second set of speech synthesis parameters;

synthesizing an estimated echo signal from said second set of speech synthesis parameters; and at least reducing the amount of the audible echo signal contained in the composite speech signal using said estimated echo signal.

2. A method according to claim 1 wherein the first set of speech synthesis parameters are linear predictive coding (LPC) parameters transmitted from a far-end source.

3. A method according to claim 2 wherein the LPC parameters comprise a far-end excitation vector and a set of far-end linear predictive (LP) coefficients.

4. A method according to claim 3 wherein the echo estimation unit generates an estimated set of echo LP coefficients from the far-end excitation vector, the set of far-end LP coefficients and the far-end speech signal, and generates an estimated echo excitation vector from the far-end excitation vector, the set of far-end LP coefficients and the far-end speech signal, the estimated set of echo LP coefficients and the estimated echo excitation vector being the second set of speech synthesis parameters.

5. A method according to claim 3 wherein the echo estimation unit generates an estimated echo excitation vector from the far-end excitation vector, the set of far-end LP coefficients and the far-end speech signal, and uses the set of far-end LP coefficients directly as an estimated set of echo LP coefficients, the estimated set of echo LP coefficients and the estimated echo excitation vector being the second set of speech synthesis parameters.

6. A method according to claim 2 wherein the LPC parameters comprise a far-end excitation vector, a set of far-end LP coefficients, a far-end long-term predictor gain factor and a far-end long-term predictor delay.

7. A method according to claim 6, wherein the echo estimation unit generates an estimated echo excitation vector from the far-end excitation vector, the set of far-end LP coefficients, the far-end long-term predictor gain factor, the far-end long-term predictor delay and the far-end speech signal, and uses the set of far-end LP coefficients, the far-end long-term predictor gain factor and the far-end long-term predictor delay directly as an estimated set of echo LP coefficients, an estimated echo long-term predictor gain factor and an estimated echo long-term predictor delay respectively, the estimated echo excitation vector, the estimated echo LP coefficients, the estimated echo long-term predictor gain factor and the estimated echo long-term predictor delay being the second set of speech synthesis parameters.

8. A method according to claim 7 wherein the echo estimation unit generates the estimated echo excitation vector on the basis of $$\hat{X}_e(n) = \sum_{j=0}^{L-1} h(j) \frac{\partial \hat{X}_e(n)}{\partial h(j)}$$

where $$\frac{\partial \hat{X}_e(n)}{\partial h(j)}$$

is the partial derivative of the estimate of the echo signal's excitation vector at time n with respect to the jth tap of the acoustic path's impulse response, and is defined as:

$$\frac{\partial \hat{X}_e(n)}{\partial h(j)} = f(n-j) - G_f f(n-j-\alpha_f) - \sum_{i=1}^{M} w_f(i) f(n-i-j) + \sum_{i=1}^{M} w_f^{-c-1}(i) G_f f(n-i-j-\alpha_f)$$

where $G_f$ is the far-end long-term predictor gain factor, $\alpha_f$ is the far-end long-term predictor delay (pitch period), $$c = floor[\alpha_f - n/P]$$

and $w_f^{-c-1}(i)$ for $1 \leq i \leq M$ are the far-end speech signal's linear predictor coefficients c−1 blocks in the past.

9. A method according to claim 1 wherein at least reducing the amount of the audible echo signal comprises subtracting the estimated echo signal from the composite speech signal.

10. A handsfree telephone terminal comprising a loudspeaker that plays a far-end speech signal, a microphone that captures a composite microphone signal consisting of a near-end speech signal and an audible echo of said far-end speech signal, a first decoder which synthesizes the far-end speech signal from a first set of speech synthesis parameters, an echo estimation unit which is connected to an input side and output side of the first decoder and is adapted to generate a second set of speech synthesis parameters from said first set of speech synthesis parameters and said far-end speech signal, a second decoder connected to an output-side of the echo estimation unit and adapted to synthesize an estimated echo signal from said second set of speech synthesis parameters, and means connected to an output side of the second decoder for at least reducing the amount of the audible echo signal contained in the composite microphone signal using said estimated echo signal.

11. A terminal according to claim 10 wherein the first set of speech synthesis parameters are linear predictive coding (LPC) parameters transmitted from a far-end source.

12. A terminal according to claim 11 wherein the LPC parameters comprise a far-end excitation vector and a set of far-end linear predictive (LP) coefficients.

13. A terminal according to claim 12 wherein the echo estimation unit comprises a first functional block and a second functional block, wherein the first functional block has an input side connected to receive the far-end excitation vector, the set of far-end LP coefficients and from the output side of the first decoder, the far-end speech signal, and an output side connected to an input side of the second decoder, the first functional block being adapted to generate on its output side an estimated set of echo LP coefficients and wherein the second functional block has an input side connected to receive the far-end excitation vector, the set of far-end LP coefficients and, from the output side of the first decoder, the far-end speech signal, and an output side connected to the input side of the second decoder, the second functional block being adapted to generate on its output side an estimated echo excitation vector.

14. A terminal according to claim 12 wherein the echo estimation unit comprises a functional block which has an input side connected to receive the far-end excitation vector, the set of far-end LP coefficients and, from the output side of the first decoder, the far-end speech signal and an output side connected to an input side of the second decoder, the functional block being adapted to generate on its output side an estimated echo excitation vector and wherein the output side of the echo estimation unit is connected directly to receive the set of far-end LP coefficients which serves as an estimated set of echo LP coefficients.

15. A terminal according to claim 11 wherein the LPC parameters comprise a far-end excitation vector, a set of far-end LP coefficients, a far-end long-term predictor gain factor and a far-end long-term predictor delay.

16. A terminal according to claim 15 wherein the echo estimation unit comprises a functional block which has an input side connected to receive the far-end excitation vector, the set of far-end LP coefficients, the far-end long-term predictor gain factor, the far-end long-term predictor delay and, from an output side of the first decoder, the far-end speech signal, and an output side connected to an input side of the second decoder, the functional block being adapted to generate on its output side an estimated echo excitation vector and wherein the output side of the echo estimation unit is connected directly to receive the set of far-end LP coefficients, the far-end long-term predictor gain factor and the far-end long-term predictor delay which serve as an estimated set of echo LP coefficients, estimated echo long-term predictor gain factor and estimated echo long-term predictor delay respectively.

17. A terminal according to claim 16 wherein the functional block generates the estimated echo excitation vector on the basis of $$\hat{X}_e(n) = \sum_{j=0}^{L-1} h(j) \frac{\partial \hat{X}_e(n)}{\partial h(j)}$$

where $$\frac{\partial \hat{X}_e(n)}{\partial h(j)}$$

is the partial derivative of the estimate of the echo signal's excitation vector at time n with respect to the jth tap of the acoustic path's impulse response, and is defined as:

$$\frac{\partial \hat{X}_e(n)}{\partial h(j)} = f(n-j) - G_f f(n-j-\alpha_f) - \sum_{i=1}^{M} w_f(i) f(n-i-j) +$$

-continued $$\sum_{i=1}^{M} w_f^{-c-1}(i) G_f f(n-i-j-\alpha_f)$$

where $G_f$ is the far-end long-term predictor gain factor, $\alpha_f$ is the far-end long-term predictor delay (pitch period), $$c = floor[\alpha_f - n/P]$$

and $w_f^{-c-1}(i)$ for $1 \leq i \leq M$ are the far-end speech signal's linear predictor coefficients c−1 blocks in the past.

18. A terminal according to claim 10 wherein said first and second decoders are identical.

19. A terminal according to claim 18 wherein the first and second decoders comprise a short-term predictor synthesis filter in cascade with a long-term predictor synthesis filter.

20. A telephone handset comprising a loudspeaker that plays a far-end speech signal, a microphone that captures a composite microphone signal consisting of a near-end speech signal and an audible echo of said far-end speech signal, a first decoder which synthesizes the far-end speech signal from a first set of speech synthesis parameters, an echo estimation unit which is connected to an input side and an output side of the first decoder and is adapted to generate a second set of speech synthesis parameters from said first set of speech synthesis parameters and said far-end speech signal, a second decoder connected to an output side of the echo estimation unit and adapted to synthesize an estimated echo signal from said second set of speech synthesis parameters, and means connected to an output side of the second decoder for at least reducing the amount of the audible echo signal contained in the composite microphone signal and said estimated echo signal.

21. An echo canceller for connection to a telephone terminal comprising a loudspeaker that plays a far-end speech signal, a microphone that captures a composite microphones signal consisting of a near-end speech signal and an audible echo of said far-end speech signal and a first decoder which synthesizes the far-end speech signal from a first set of speech synthesis parameters, wherein the echo canceller comprises an echo estimation unit for connection to an input side and an output side of the first decoder and adapted to generate a second set of speech synthesis parameters from said first set of speech synthesis parameters and said far-end speech signal, a second decoder connected to an output side of the echo estimation unit and adapted to synthesize an estimated echo signal from said second set of speech synthesis parameters and means connected to an output side of the second decoder for at least reducing the amount of the audible echo signal contained in the composite microphone signal using said estimated echo signal.

* * * * *